(12) United States Patent
Iliev et al.

(10) Patent No.: US 6,996,521 B2
(45) Date of Patent: Feb. 7, 2006

(54) AUXILIARY CHANNEL MASKING IN AN AUDIO SIGNAL

(75) Inventors: Alexander I. Iliev, Miami, FL (US); Michael S. Scordilis, Miami, FL (US)

(73) Assignee: The University of Miami, Miami, FL (US)

( * ) Notice: Subject to any disclaimer, the term of this patent is extended or adjusted under 35 U.S.C. 154(b) by 839 days.

(21) Appl. No.: 09/969,615

(22) Filed: Oct. 4, 2001

(65) Prior Publication Data

US 2002/0059059 A1 May 16, 2002

Related U.S. Application Data

(60) Provisional application No. 60/238,009, filed on Oct. 6, 2000.

(51) Int. Cl.
*G01L 11/00* (2006.01)

(52) U.S. Cl. .................. 704/200; 704/200.1; 704/230; 375/240.03

(58) Field of Classification Search ................ 704/200, 704/200.1, 230; 128/746; 395/2.14; 375/240.03
See application file for complete search history.

(56) References Cited

U.S. PATENT DOCUMENTS 5,645,074 A * 7/1997 Shennib et al. ............. 600/559
5,682,461 A * 10/1997 Silzle et al. ................. 704/205
6,738,423 B1 * 5/2004 Lainema et al. ....... 375/240.03

FOREIGN PATENT DOCUMENTS

WO   WO 99/11020     3/1999
WO   WO 00/04662     1/2000

OTHER PUBLICATIONS

International Search Report for Application No. PCT/US 01/31214, dated May 28, 2002.
XP-001076669, David R. Perrott et al., "Minimum Audible Angle Thresholds for Sources Varying in Both Elevation and Azimuth", J. Acoust. Soc. Am., vol. 87 No. 4, Apr. 1990, pp. 1728-1731.

(Continued)

*Primary Examiner*—W. R. Young
*Assistant Examiner*—Jakieda Jackson
(74) *Attorney, Agent, or Firm*—Christopher & Weisberg, P.A.

(57) ABSTRACT

A method is provided for embedding data into an audio signal and determining data embedded into an audio signal. In the method for embedding data into an audio signal, the audio signal is based on a first set of data and includes a phase component. The method modifies at least a portion of the phase component of the audio signal to embed a second set of data into the audio signal. The modified audio signal can be made to differ with respect to the audio signal in a manner at least one of (i) substantially imperceptible and (ii) imperceptible to a listener of the first set of data depending on the extent that the phase component of the audio signal is modified. In the method for determining data embedded into an audio signal, the audio signal is based on a first set of data of an original audio signal and includes a phase component. The method determines a second set of data embedded into the audio signal based on the phase component of the audio signal. The audio signal differs with respect to the original audio signal in a manner that is at least one of (i) substantially imperceptible and (ii) imperceptible to a listener of the first set of data.

15 Claims, 11 Drawing Sheets

OTHER PUBLICATIONS

XP-001076670, Armin Kohlrausch, "Binaural Masking Experiments Using Noise Maskers With Frequency-Dependent Interaural Phase Differences. II: Influence of Frequency and Interaural-Phase Uncertainty", J. Acoust. Soc. Am., vol. 88 No. 4, Oct. 1990, pp. 1749-1756.

XP-002197648, Tolga Ciloglu et al., "An Improved All-Pass Watermarking Scheme for Speech and Audio", Proceedings of IEEE International Conference on Multimedia and Expo, New York, NY, USA, Jul. 30, 2000, vol. 2, pp. 1017-1020.

XP-000635079, W. Bender et al., "Techniques for Data Hiding", IBM Systems Journal, vol. 35, Nos. 3 and 4, 1996, pp. 313-335.

John F. Tilki et al., "Encoding a Hidden Auxiliary Channel Onto a Digital Audio Signal Using Psychoacoustic Masking", Proceedings of IEEE Southeastoon '97, Blacksburg, VA, USA Apr. 12-14, 1997, pp. 331-363.

* cited by examiner

AUXILIARY CHANNEL MASKING IN AN AUDIO SIGNAL

This application claims the benefit of U.S. Provisional Application No. 60/238,009, filed Oct. 6, 2000, which is incorporated in this application by this reference.

BACKGROUND

1. Field of the Invention

This invention generally relates to the field of signal processing and communications. More particularly, the present invention relates to embedding data into an audio signal and detecting data embedded into an audio signal.

2. Description of Background Information

The efficient and secure storage and distribution of digital audio signals are becoming issues of considerable importance for the information revolution currently unfolding. The challenges of the storage and distribution of such signals arise particularly from the digital nature of modern audio. Most modern digital audio allows for the creation of unlimited, perfect copies and may be easily and massively distributed via the Internet. Nevertheless, such digital nature also makes possible the adoption of intelligent techniques that can contribute in the control of unauthorized copying and distribution of multimedia information comprising audio. In addition, opportunities arise whereby digital audio may be used as a medium for the delivery of enhanced services and for a more gratifying audio and/or visual experience.

The efficient and secure storage and distribution of digital audio signals are becoming issues of considerable importance for the information revolution currently unfolding. The challenges of the storage and distribution of such signals arise particularly from the digital nature of modern audio. Most modern digital audio allows for the creation of unlimited, perfect copies and may be easily and massively distributed via the Internet. Nevertheless, such digital nature also makes possible the adoption of intelligent techniques that can contribute in the control of unauthorized copying and distribution of multimedia information comprising audio. In addition, opportunities arise whereby digital audio may be used as a medium for the delivery of enhanced services and for a more gratifying audio and/or visual experience.

Audio delivery through a network (e.g., the Internet), presented as a stand-alone service or as part of a multimedia presentation, comes in a large range of perceived qualities. Signal quality depends on the audio content (e.g., speech and music), the quality of the original recording, the available channel bandwidth, and real-time transmission constraints.

Real-time Internet audio usually applies to broadcasting services. It is generally achieved by streaming audio, which is decoded at a receiving workstation. Real-time transmission requirements impose limitations on signal quality. At present, audio streaming delivers quality comparable to AM radio.

By relaxing real-time constraints, new opportunities for services have appeared where the quality and security of the transmitted audio is enhanced. Such services include the secure downloading of CD-quality music at transmission rates that are too high for real-time transmission but lower than the CD standard. Such signal compression capitalizes on psychoacoustic properties of human hearing.

Security and authentication of audio distributed over networks (e.g., non-homogeneous networks) is also often required, in addition to low bit rates that do not compromise audio quality. Moreover, perceptual coding may be used for the insertion of new, secure information to an original audio signal in a way that this information remains inaudible and extractable by secure means. This process is generally referred to as watermarking.

Simultaneous frequency masking is used to implement perceptual coding and transparent watermarking in digital audio. Frequency masking is a property of hearing that renders audio signal components in a frequency region inaudible if a component of higher energy is in the same vicinity. The ability of the dominant component to mask others depends on its relative energy and on its proximity to the other audio signal components. In addition to simultaneous frequency masking, temporal masking is used to reduce pre-echoes and post-echoes resulting from signal processing.

While masking in the power spectrum of auditory signals dominates audio coding and watermarking techniques, the phase information has not been involved to date (see, e.g., Nyquist & Brand, *Measurements of Phase Distortion*, BELL SYS. TECH. J., Vol. 7, 522–49 (1930); D. Preis, *Phase and Phase Equalization in Audio Signal Processing—A Tutorial Review*, J. AUDIO ENGINEERING SOCIETY, Vol. 30, No. 11, 774–94 (1982)).

DETAILED DESCRIPTION

Figure 1:
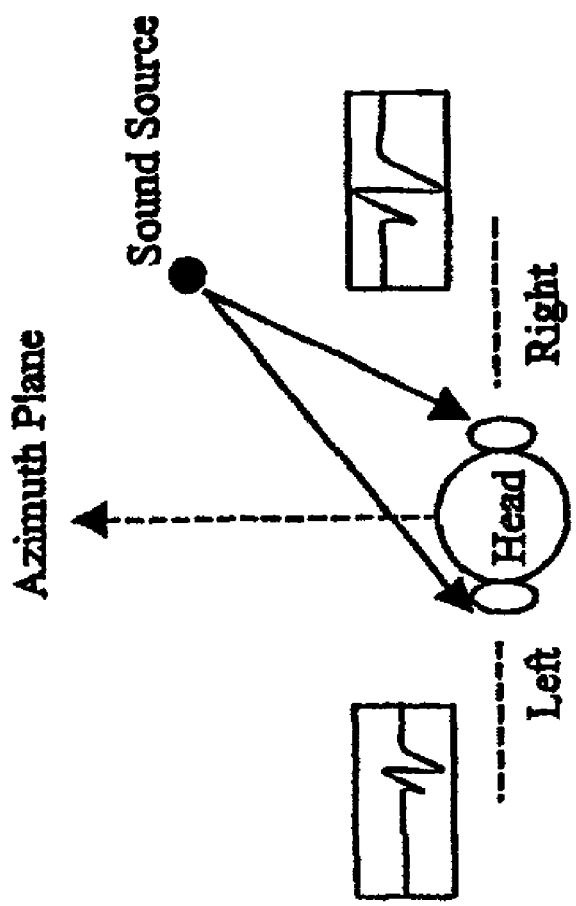
FIG. 1 depicts relative phase and intensity differences due to a source located on an azimuth plane.

An embodiment of a method allows for signal processing to include information, such as an auxiliary channel, in an audio signal (e.g., a stereo audio signal), in a manner that is not perceptible by listening. This included information does not limit the capacity of data that the original, unmodified audio signal may contain. The method, for example, uses principles of binaural hearing, and the minimum audible angle ("MAA") in particular, which is the minimum detectable angular displacement of a sound source in auditory space. The method then varies a phase spectrum (e.g., short-time phase spectrum) of an audio signal within a range controlled by the MAA to encode information (e.g., digital information) in various forms (e.g., text, images, speech, and music) into the phase spectrum of the audio signal.

This method is simpler to compute and to implement than simultaneous frequency masking in the power spectrum, mentioned above, and allows for simultaneous encoding of a masked digital multimedia signal. The method allows, in effect, for the "hiding" (e.g., masking) of considerably more information in an audio signal than simultaneous frequency masking. Also, the method may allow for the inclusion of audibly imperceptible parallel (e.g., information related to the audio signal) and/or secure (e.g., encrypted) information in an audio signal.

As used herein, the term audio signal encompasses any type of signal comprising audio. In addition to including traditional stand-alone audio, the term audio signal also encompasses any audio that is a component of a signal including other types of data. For example, the term audio signal as used herein extends to audio components of multimedia signals, of video signals, etc. Furthermore, as used herein, an auxiliary channel is simply a form of data or information that may be embedded into an audio signal and/or detected as embedded in an audio signal. While the information in an auxiliary channel as used herein may be in stream format such as audio or video, the information and data that may be embedded and/or detected in an audio signal may also be in non-stream format such as one or more images or items of text.

The detailed description refers to the accompanying drawings that illustrate embodiments of the present invention. Other embodiments are possible and modifications may be made to the embodiments without departing from the spirit and scope of the invention. Therefore, the detailed description is not meant to limit the invention. Rather the scope of the invention is defined by the appended claims, and their equivalents.

Embodiment of a Binaural Hearing Phase Tolerance Model

Binaural Phase Information in Sound Source Localization

To estimate direction and distance (i.e., location) of a sound source, a listener uses binaural (both ears) audible information. This may be achieved by the brain processing binaural differential information and includes:

interaural phase or time difference (IPD/ITD);

interaural intensity or loudness difference (IID/ILD); and spectral notches, whose locations depend on the elevation angle of incidence of the sound wavefront.

FIG. 1 depicts an example of a sound source located on the azimuth plane and of plausible audio signal segments arriving at a listener's ears. The sound source in FIG. 1 is closer to the right ear and as a result sound from the sound source arrives at the right ear earlier than the left ear. Since all sounds travel with equal speed in space, the frequency-dependent time difference perceived is in the interaural phase difference or IPD. For a source at a fixed distance, a minimum angular movement may be detectable by listening. This MAA may be dependent on elevation, azimuth, and frequency. The changes in phase and intensity may vary as a sound source is moved around the head of a listener.

The IID/ILD is another type of binaural difference perceived. In FIG. 1, the audio signal at the right ear has higher intensity or loudness than the audio signal arriving at the left ear because of the inverse square distance law applying to spherical wave propagation in free space, as well as the contribution of the acoustic shadow of the head falling on the left hemisphere.

MAA/IPD Relationship

Figure 2:
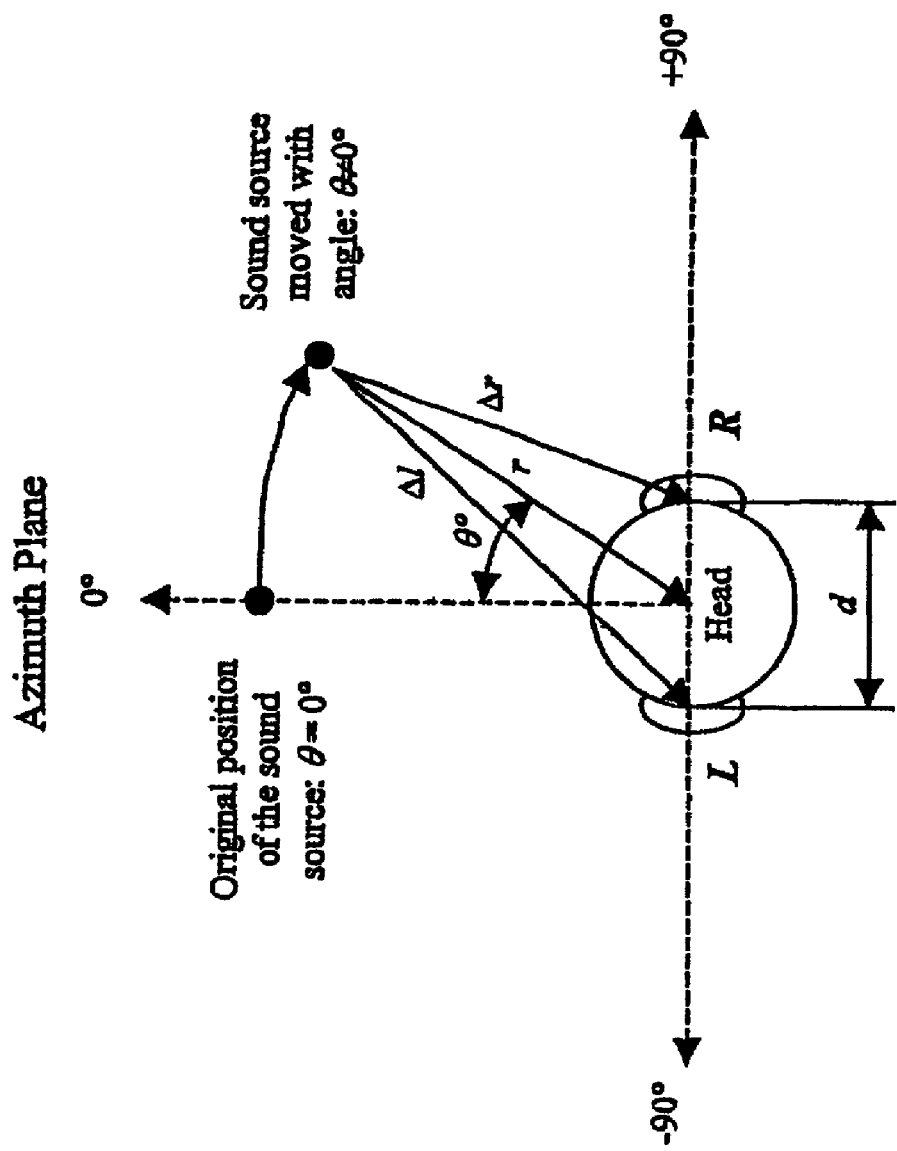
FIG. 2 depicts a sound source on an azimuth plane.

FIG. 2 illustrates a geometrical relationship of parameters related to a sound source located on the azimuth plane comprising a listener's ears (i.e., a horizontal plane). The MAA plays a significant role in sound localization. In FIG. 2, $\theta$ is an azimuth angle, r is a distance from the sound source to the center of the listener's head, and d is an interaural distance. The distance of the source from the right ear is $\Delta r$ and from the left ear is $\Delta l$, whereas $\Delta d$ is their difference, which may be expressed as:

$$\Delta r^2 = (r*\cos\theta)^2 + \left(r*\sin\theta - \frac{d}{2}\right)^2, \text{ and} \tag{1}$$

$$\Delta l^2 = (r*\cos\theta)^2 + \left(r*\sin\theta + \frac{d}{2}\right)^2, \text{ so} \tag{2}$$

$$\Delta d = \Delta r - \Delta l \tag{3}$$

Figure 3:
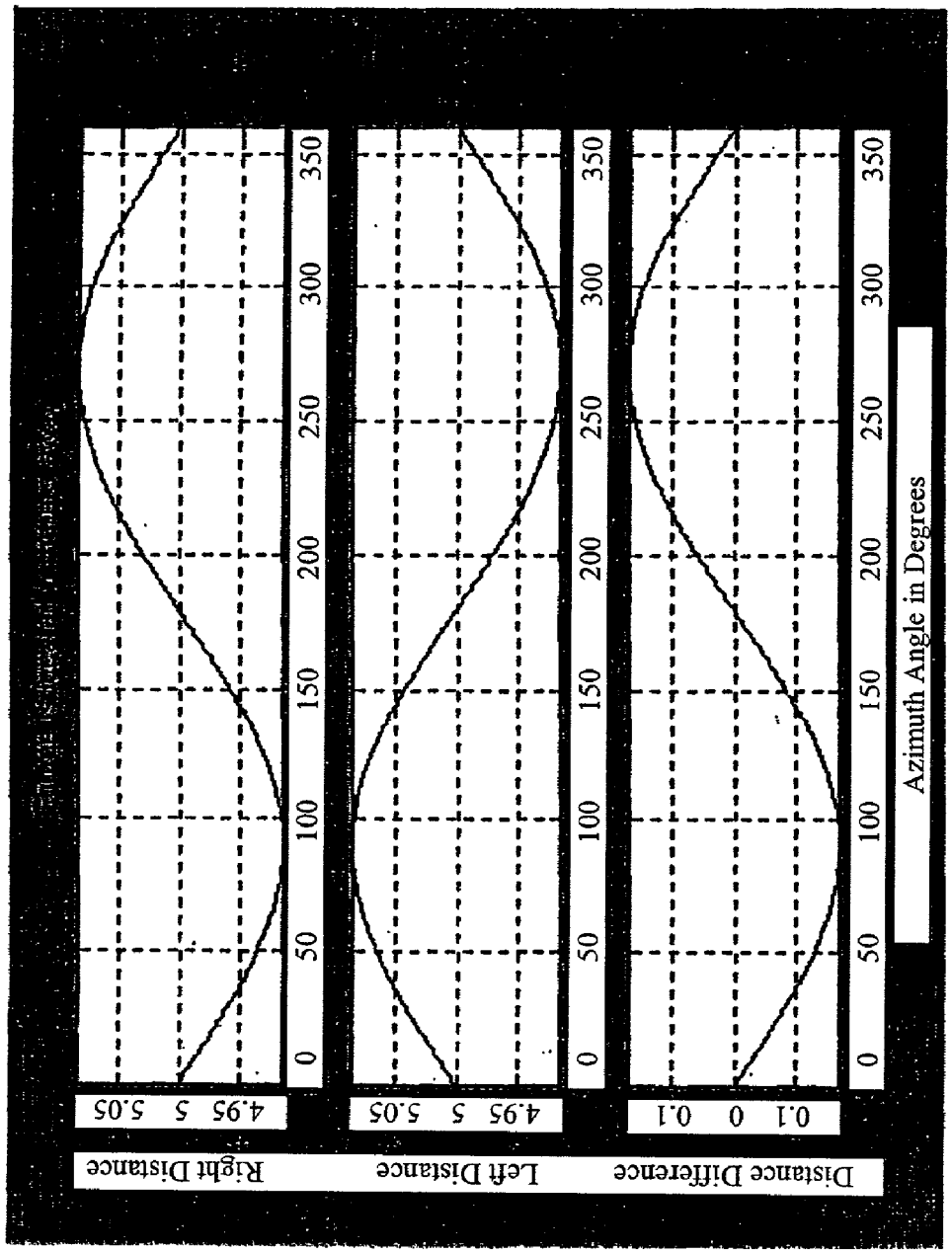
FIG. 3 depicts, for a sound source distance of r=5 m, plots of distances between a sound source and each of two ears, and a plot of the differences of the distances between the sound source and of each of the two ears.
Figure 4:
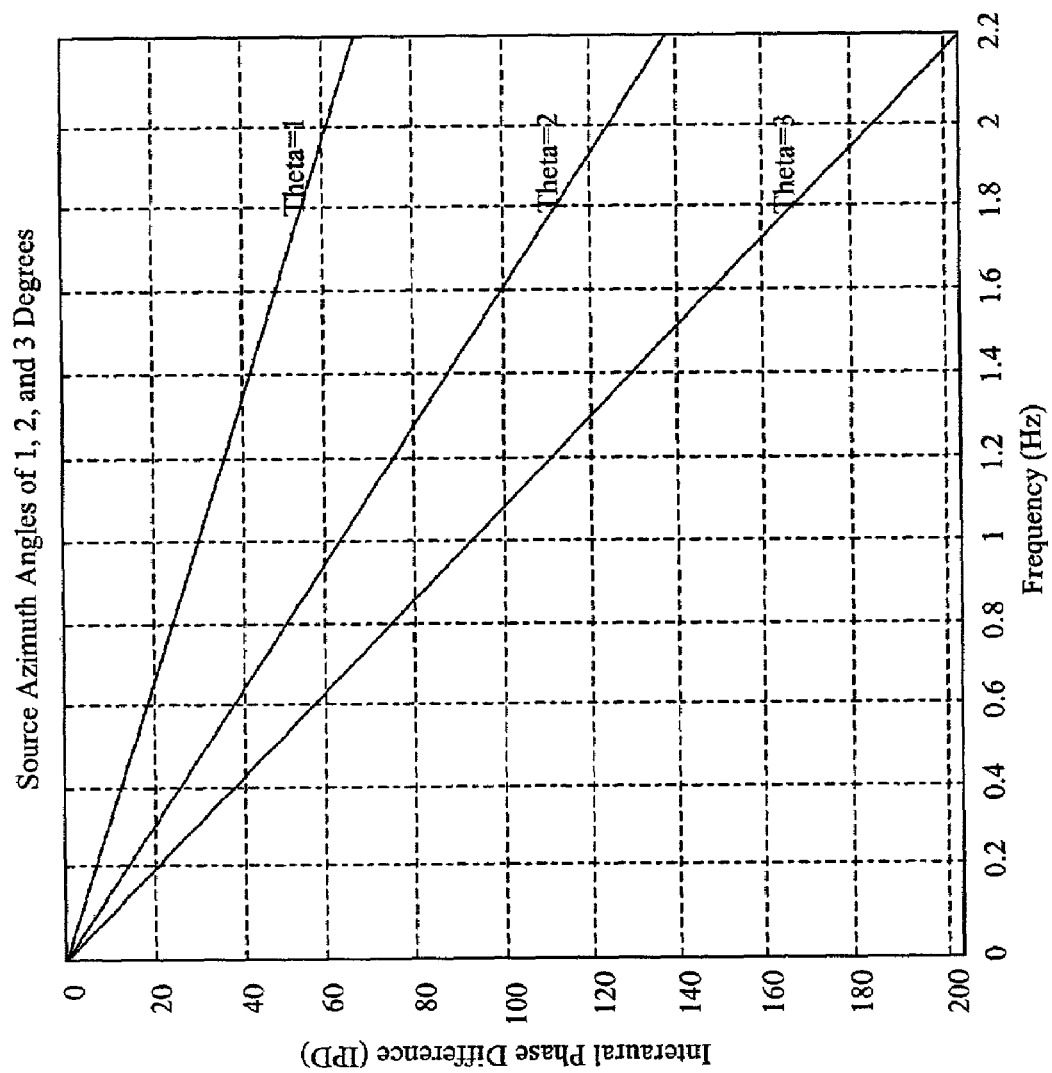
FIG. 4 depicts interaural phase differences (in degrees) plotted against frequency for azimuth angles of 1, 2, and 3 degrees.

FIG. 3 depicts a plot of exemplary $\Delta r$, $\Delta l$ and $\Delta d$ for: source distance of r=5 meters, interaural distance of d=0.17 m (i.e., a typical interaural distance for an adult listener), zero elevation, and azimuth angle changing over a complete revolution around the listener. $\Delta d$ is independent of source distance (see above). The IPD is a function of frequency and may be expressed as:

$$\Phi = \Delta d * \left(\frac{f}{c}\right) * 360° \text{ or } \Phi = \Delta d * \left(\frac{f}{c}\right) * 2 * \pi \text{ radiians,} \tag{4}$$

where $\Phi$ is the resulting IPD, f is the frequency of a sound source, and c is the speed of sound in air. FIG. 4 illustrates a plot of $\Phi$ for azimuth angles of 1°, 2° and 3°, where c=344 m/s.

Figure 5:
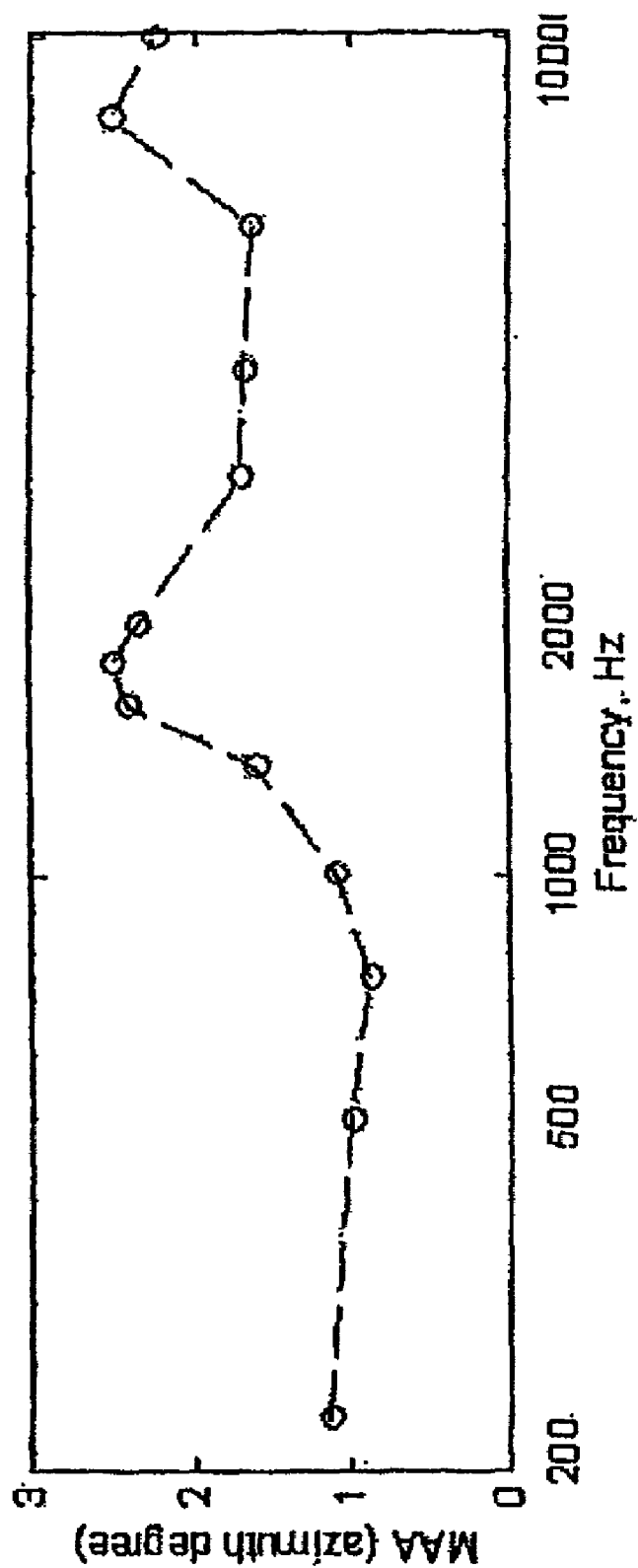
FIG. 5 depicts minimum audible angle values as a function of frequency for zero azimuth and zero elevation.

On the one hand, the IPD detectable by the human auditory system for a source moving on the azimuth plane is a function of the MAA, as expressed in equations (1) to (4), and depicted on FIG. 4. On the other hand, the MAA is a function of source location and frequency, with highest sensitivity corresponding to source movements confined on the azimuth plane, such as, for example, in a forward direction (e.g., azimuth angle, $\theta$=0°) (see W. A. Yost, FUNDAMENTALS OF HEARING (1993)). FIG. 5 depicts a plot of the MAA as a function of frequency for $\theta$=0°.

FIG. 5 illustrates that, in the most sensitive region of the acoustic space (e.g., zero azimuth and zero elevation), the MAA ranges from about 1° to 2.5°. Angular values may be smallest for frequencies below 1 kHz and increase for higher frequencies. If an MAA of 1° is assumed (the conservative, worst case selection), then the resulting maximum imperceptible IPD may be expressed as:

$$IPD_{max} = -3.104E - 3 * f (\text{degrees}) \tag{5}$$

As such, the maximum IPD values may range from 0° at DC (i.e., 0 Hz) to −68.3° at 22 kHz. Source movements that result in IPD values within that frequency-dependent upper bound may not be detectable by the human auditory system.

Inaudible Random Phase Distortion for Stereo Audio Signals

The analysis described above is based on a sound source emitting a pure sinusoidal tone and localized by binaural hearing. For a group of sound sources, the MAA and IPD results would be valid for such sources emitting the same tone. Principles of linearity and superposition suggest that a group of sound sources emitting identical pure tones at the same loudness levels may not be able to be distinguished into individual sound sources provided that their locations are within an MAA corresponding to their spatial location. As such, a pair of identical sound sources will be perceived to be fused to a single sound source if their separation is smaller than the corresponding MAA of the region containing such sound sources or if the resulting IPD is below computed maximum limits (i.e., a threshold).

In an experiment, a stereo audio signal consisting of identical tones was synthesized and an image of one channel was moved by increasing a phase difference between the two channels. Listening tests confirmed that IPDs corresponding to an MAA of between 1° and 2° were not detectable. Such observations were in agreement with results reported in the relevant scientific literature (see, e.g., W. A. Yost, FUNDAMENTALS OF HEARING (1993)).

A set of experiments was then conducted to determine the extent to which the principles of linearity and superposition apply in a case of complex acoustic stimuli, as opposed to a case of pure tones. Using Fourier analysis (e.g., using the Fast Fourier Transform (FFT) algorithm), audio signals may be expressed as a weighted sum of sinusoids at different oscillating frequencies and different phase values.

Short-time Fourier analysis, for example, was performed on speech and music stereo audio signals sampled at 44,100 Hz. FFT was applied on 1024-point rectangular windows. The resulting frequency components located at about each 21.5 Hz apart were considered as independent stimuli. The FFT algorithm provided the phase value of each component in modulo ($2\pi$) form. Because $2\pi$ rotation of a sound source on a particular plane corresponds to one full rotation, the phase was not unwrapped to its principal value. The number of rotations a source may have made is of no consequence. The cosine of a phase difference between right and left channels (e.g., a stereo pair) was used to test the corresponding IPD. When $$\cos[(\text{phase}(\text{right}, f_i) - \text{phase}(\text{left}, f_i)] > \cos(-3.104E-3 * f_i) \quad (6)$$

where $f_i$ is frequency samples from 0 Hz to 44,100/2 Hz, and phase is in degrees, the phase information of the stereo pair at $f_i$ was considered blurred. All such components were identified on a short-time basis, their right channel was left intact, while the phase of their left channel at $f_i$ was randomly changed up to the value of $IPD_{max}$ corresponding to $f_i$. The altered stereo audio signal was resynthesized through an Inverse Fast Fourier Transform (IFFT) algorithm. Listening tests, where subjects were presented with the original and the processed stereo audio signals, revealed that it was not possible to distinguish between the two stereo audio signals. Thus, the linearity and superposition principles were proven to be valid for the given conditions; thereby, the results for pure tone audio signals may be extended to complex acoustic stimuli.

Listening tests for MAA of 2° and 3° were also performed with and various types of audio selected as the masker audio signal and with broadband noise being the data, in the form of another audio signal, masked into the masker signal. When 3° was used for the MAA, the affected changes were perceivable for all masker audio signals and all listeners. When 2° was used for the MAA, the change to the audio signal remained nearly unnoticeable for rock music, and somewhat audible for speech and classical music. For the case of $\theta=1°$, however, the broadband noise was successfully masked for all masker audio signals and all listeners, confirming that $\theta=1°$ as a possible maximum unnoticeable angular displacement of the sound source from the median plane.

Having extended the MAA results for azimuth angles to complex acoustic stimuli and determined that the phase spectrum of audio signals may be randomly disturbed within the IPD bounds resulting from the MAA, masking meaningful information into an audio signal was performed. Frequency components having an IPD below an audible threshold may be identified and set to zero to achieve signal compression. Also, new information may be included as an auxiliary channel that is not audibly perceptible to a listener (e.g., watermarked). The auxiliary channel may be made further secure by encryption.

Embodiment of an Encoder of an Auxiliary Channel

Figure 6:
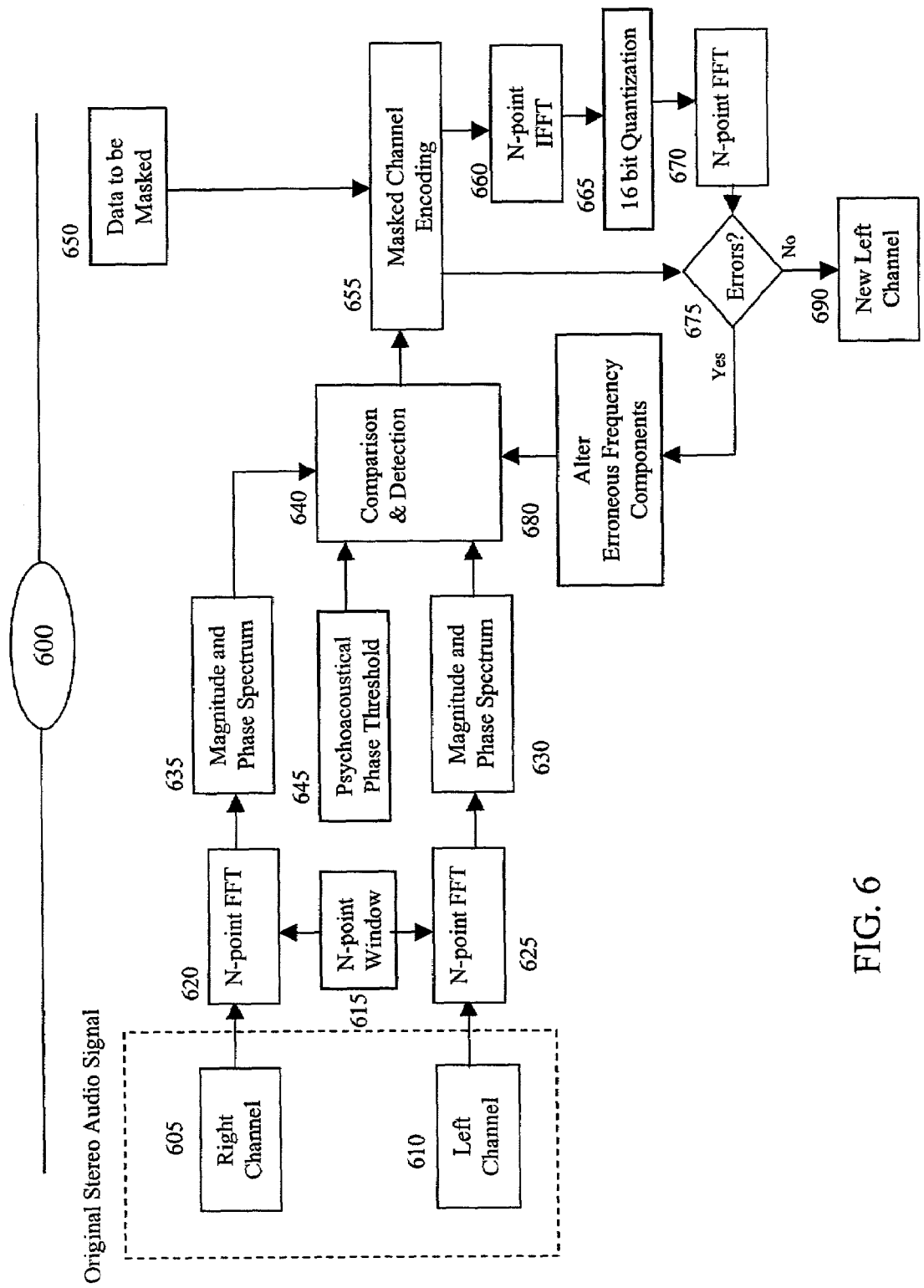
FIG. 6 depicts an embodiment of a method for an encoder of an auxiliary channel.

FIG. 6 depicts an embodiment of a method 600 for an encoder of a masked audio signal. In block 605, the method 600 receives a right channel of an audio signal (e.g., a CD-quality stereo audio signal). In block 610, the method 600 receives a left channel of the audio signal. The method 600 may perform a complete analysis-resynthesis loop, and may apply N-point rectangular windows to the left channel and to the right channel to start a short-time analysis of the audio signal, as block 615 illustrates. In block 620, a first FFT algorithm computes a magnitude spectrum and a phase spectrum of the right channel, illustrated in block 635. In block 625, a second FFT algorithm computes a magnitude spectrum and a phase spectrum of the left channel, illustrated in block 630. In an embodiment, a 1024-point rectangular window (e.g., N=1024) is applied.

In block 640, the method 600 compares the phase difference between the left channel and the right channel for each frequency component against an IPD psychoacoustic threshold, expressed in, for example, equation (6) where the MAA=1° and illustrated in block 645. Phase components outside the threshold may be left untouched and passed on for synthesis. The remaining components are part of the encoding space.

In block 650, method 600 receives data to be masked into the audio signal. For the case of encoding a single-bit-per-frequency-component whenever a logical zero is being encoded, for example, the phase values of the left channel and the right channel may be made equal. For the case of logical one being encoded, for example, the phase difference between the two channels may be made less or equal to the maximum permissible IPD for that frequency component. The method 600 may use a 1-bit encoding process as follows:

$$\text{phase}[X_L(f)] = \text{phase}[X_R(f)] \rightarrow \text{logical } 0 \quad (7.1)$$

$$\text{phase}[X_L(f)] = kIPD_{max}(f) \rightarrow \text{logical } 1 \quad (7.2)$$

$$\text{phase}[X_L(f)] >= IPD_{max}(f) \rightarrow \text{no encoding} \quad (7.3)$$

The approach taken in this process is to use the right channel as reference and to alter the phase of the left channel. Constant k in equation (7.2) specifies the amount of phase difference within the IPD threshold which would denote a logical one. In an embodiment, $k=\frac{1}{2}$ was used.

In block 655, the method 600 collects all the frequency components of the left channel, both those altered as well as those left unchanged by the application of the psychoacoustical threshold comparison and constructs the new frequency representation of the left channel which now contains the masked data.

In block 660, method 600 computes the N-point IFFT of the new left channel to produce its time-domain representation. This is followed by a 16 bit quantization of the produced time sequence, which is a preferred representation of digital audio signals (e.g., CD-quality audio).

The effects of quantization noise on the masking process are tested in method 600 by employing an N-point FFT in block 670 that converts the obtained time sequence of the new left channel back into the frequency domain. Block 675 compares the frequency representation of the new left channel obtained via high-precision arithmetic and available at block 655 against its representation which has been subjected to 16-bit quantization in the time domain. If the quantization has disturbed the representation of the masked data then the erroneous frequency components are detected and rendered unusable by the masking process by making their phases large enough to escape encoding in the next round. This is achieved in block 680 by making the phase of the erroneous frequency components correspond to 120% of the IPD of that frequency location. The new phase profile of the left channel is again presented to block 655 for encoding the masked data via block 640. This testing cycle repeats until no errors are detected in the masking process. If the inserted data masked in a given N-point audio signal frame has not been altered by the quantization process and therefore no errors were detected then the encoding process has been declared successful and the new N points of the left channel are presented for storage or transmission at block 690. This encoding process continues with subsequent N-point frames of the original audio signal until no more data are left in block 650.

As will be apparent to those skilled in the art, a variant of method 600 may equally be applied to alter the right channel and use the left channel as reference. Additionally, to those skilled in the art, a variant of the method 600 may be applied to alter both the left and right channels. Moreover, the method 600 may be applied to just one channel or extended to more channels than just left and right channels.

Embodiment of a Decoder of an Auxiliary Channel

Figure 7:
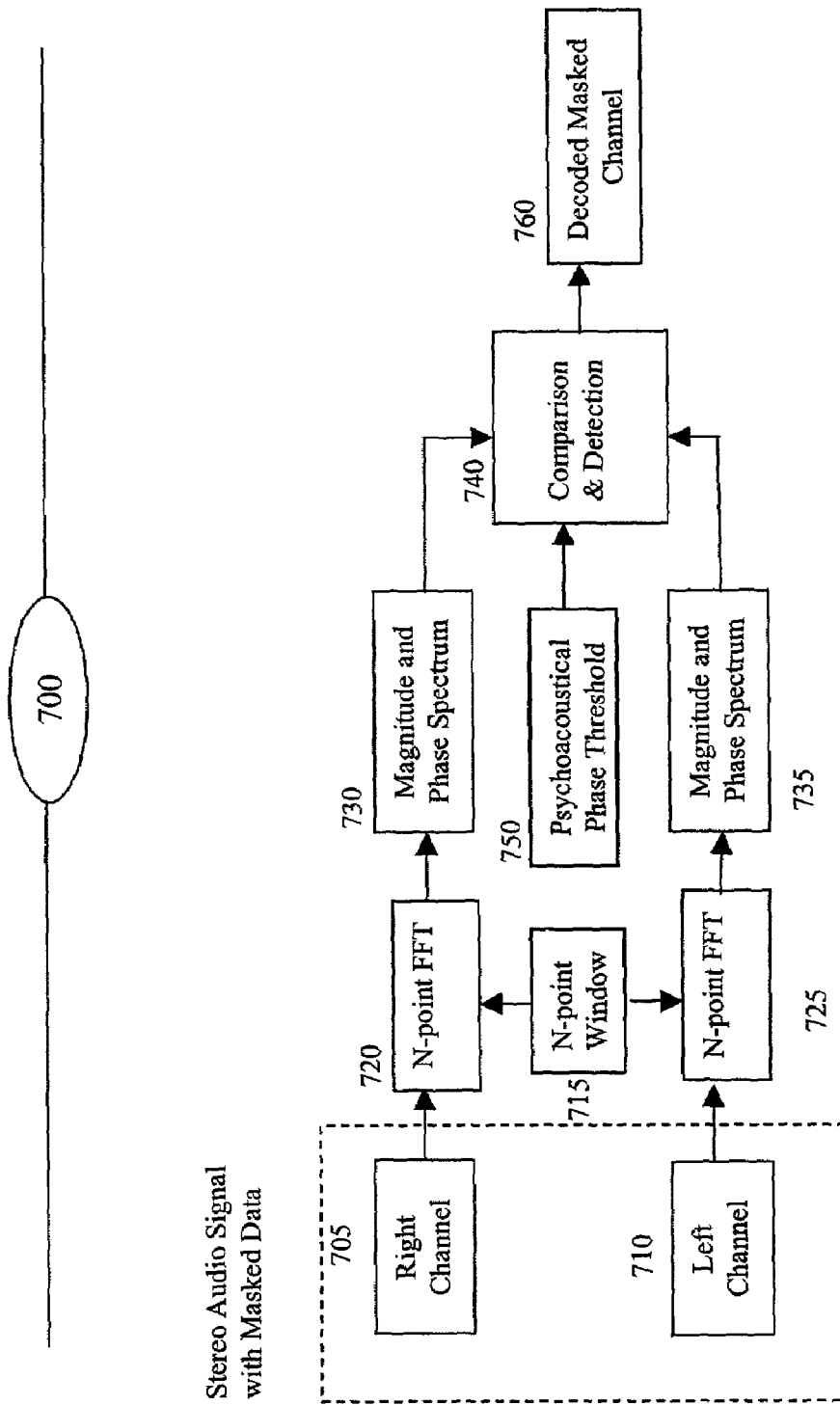
FIG. 7 depicts an embodiment of a method for a decoder of an auxiliary channel.

FIG. 7 depicts an embodiment of a method 700 for a decoder of a masked audio signal. In block 705, the method 700 receives a right channel of an audio signal (e.g., a CD-quality stereo audio signal). In block 710, the method 700 receives a left channel of the audio signal. The method 700 may apply N-point rectangular windows to the left channel and to the right channel to start a short-time analysis of the audio signal, as block 715 illustrates. The value of N should, although not necessarily, match the corresponding value used during encoding, for example, in an embodiment N=1024. In block 720, a first FFT algorithm computes a magnitude spectrum and a phase spectrum of the right channel, illustrated in block 730. In block 725, a second FFT algorithm computes a magnitude spectrum and a phase spectrum of the left channel, illustrated in block 735.

In block 740, the method 700 examines the phase information for every frequency component against an IPD psychoacoustic threshold, expressed in, for example, equation (7) and illustrated in block 750, to detect the presence of encoded data masked into the audio signal. In block 760, the method 700 decodes the encoded information corresponding to the data masked into the audio signal according to the following process:

$$|phase[X_L(f)] - phase[X_R(f)]| \leq <r_1 IPD_{max}(f) \rightarrow \text{logical } 0 \quad (8.1)$$

$$r_1 IPD_{max}(f) < |phase[X_L(f)] - phase[X_R(f)]| \leq <r_2 IPD_{max}(f) \\ \rightarrow \text{logical } 1 \quad (8.2)$$

$$|phase[X_L(f)] - phase[X_R(f)]| > r_2 IPD_{max}(f) \rightarrow \text{no encoding} \quad (8.3)$$

Constants $r_1$ and $r_2$ in equations (8.1), (8.2) and (8.3) specify the ranges of phase differences used in the decoding process to extract logical 0, logical 1 or to indicate that no encoding was included in the particular frequency component under examination. In an embodiment, $r_1 = \frac{1}{2}$ and $r_2 = \frac{3}{4}$ were used.

In this embodiment of method 700, the left channel remains unchanged and it is imperceptibly different from the "original" left channel presented to the encoder, while the right channel has been used as the reference channel in the process and it is quantitatively and perceptually the same as that presented to the encoder. The decoded data in block 760 is identical to the data provided to the encoder in block 650.

As will be apparent to those skilled in the art, a variant of method 700 may equally be applied to decode the right channel where the left channel is used as reference. Additionally, to those skilled in the art, a variant of the method 700 may be applied to decode both the left and right channels. Moreover, the method 700 may be applied to just one channel or extended to more channels than just left and right channels.

Embodiment for Encoding and Decoding a Plurality of Bits into an Audio Signal

The method in an embodiment described above concerned the encoding of a single bit per frequency component. A method of another embodiment, however, is provided for increasing the masked auxiliary channel capacity by encoding more complicated bit patterns in every suitable frequency location, in part by relying on the finding that the IPD threshold increases linearly with frequency, as illustrated in FIG. 4. The method may encode multiple bits per frequency component by setting uniform quantization levels in phase for frequency components that satisfy the IPD threshold test. The number of quantization steps may be kept constant through the usable frequency range by increasing its size linearly with frequency following the linear increase of the phase threshold.

For the case of M multiple-bits-per-frequency-component encoding, the IPD may be segmented into intervals equal in number to $2^M$, where M is the number of bits to be encoded in a frequency component. For example, for M=2, the following process may be used:

$$phase[X_L(f)] = phase[X_R(f)] \rightarrow \text{word } 00 \quad (9.1)$$

$$phase[X_L(f)] = 0.25 IPD_{max}(f) \rightarrow \text{word } 01 \quad (9.2)$$

$$phase[X_L(f)] = 0.5 IPD_{max}(f) \rightarrow \text{word } 10 \quad (9.3)$$

$$phase[X_L(f)] = 0.75 IPD_{max}(f) \rightarrow \text{word } 11 \quad (9.4)$$

$$phase[X_L(f)] >= IPD_{max}(f) \rightarrow \text{no encoding} \quad (9.5)$$

The corresponding decoder would use the following approach to extract the digital information masked in a particular frequency location:

$$|phase[X_L(f)] - phase[X_R(f)]| = <0.125 IPD_{max}(f) \rightarrow \text{word} \\ 00 \quad (10.1)$$

$$0.125IPD_{max}(f) < |phase[X_L(f)] - phase[X_R(f)]|$$
$$|\leq 0.375IPD_{max}(f) \rightarrow \text{word 01} \quad (10.2)$$

$$0.375IPD_{max}(f) < |phase[X_L(f)] - phase[X_R(f)]|$$
$$|\leq 0.625IPD_{max}(f) \rightarrow \text{word 10} \quad (10.3)$$

$$0.625IPD_{max}(f) < |phase[X_L(f)] - phase[X_R(f)]|$$
$$|\leq 0.875IPD_{max}(f) \rightarrow \text{word 11} \quad (10.4)$$

$$|phase[X_L(f)] - phase[X_R(f)]| > 0.875IPD_{max}(f) \rightarrow \text{no encoding} \quad (10.5)$$

Alternatively, quantization steps of equal width may be used in particular frequency bands thus increasing the number of conversion steps as a function of frequency. Specifically, higher frequency bands may be made to accommodate more quantization steps thus permitting the encoding of more bits resulting in a substantial increase in the masked auxiliary channel capacity.

The total capacity of the masked auxiliary channel would depend on the type of quantization employed and on the nature of the original audio signal used as the masker audio signal. For example, the more similar the left and right channels are on a short-time basis, the greater the amount of data that may be masked.

Embodiment for Embedding Data into an Audio Signal

Figure 8:
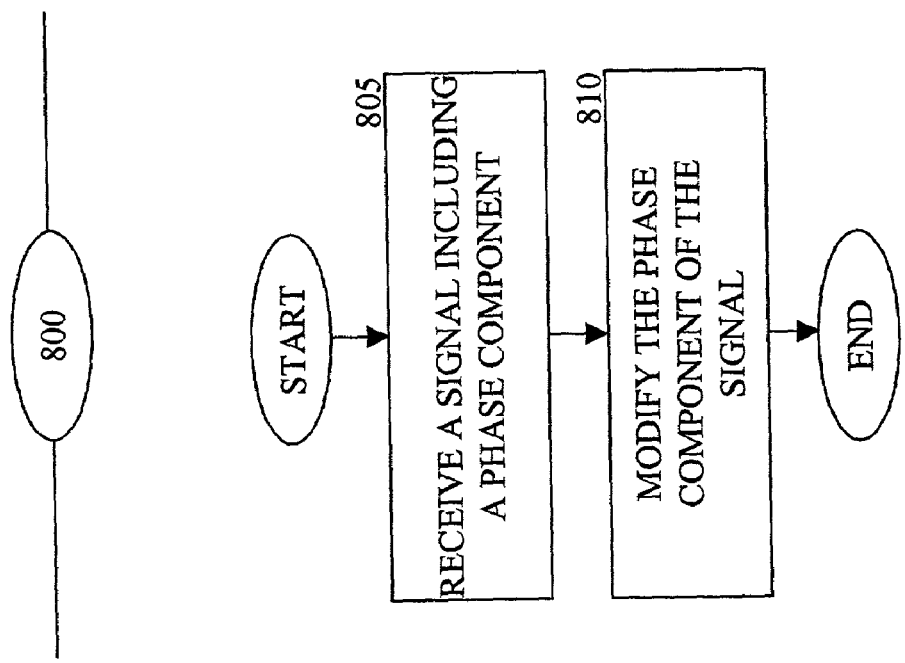
FIG. 8 depicts an embodiment of a method for embedding data into an audio signal.

FIG. 8 illustrates an embodiment of a general method 800 for embedding data into an audio signal. In block 805, the method 800 receives an audio signal. The audio signal is based on a first set of data and includes a phase component. In block 810, the method 800 then modifies at least a portion of the phase component of the audio signal to embed a second set of data into the audio signal. The modified audio signal can be made to differ with respect to the original audio signal in a manner that is at least one of (i) substantially imperceptible and (ii) imperceptible to a listener of the first set of data depending on the extent that the phase component of the audio signal is modified. The phase component of the audio signal may be modified based on at least one of (i) a threshold of a MAA (see above), which may include angles of 1 to 3 degrees, and (ii) a threshold related to an IPD (see above).

The audio signal may include a first channel and a second channel. The first channel includes a first phase component and the second channel includes a second phase component. The first phase component and the second phase component may be determined using Fourier analysis, which may include at least one of fixed and floating point arithmetic. The amount of the second set of data may be dependent on the phase of uniform quantization levels of the at least one of the first phase component and the second phase component. A frequency component of the audio signal having an interaural phase difference (IPD) below an audible threshold may be set to zero for compression of the audio signal.

The modification of the phase component of the audio signal to embed the second set of data into the audio signal may include modifying at least a portion of at least one of the first phase component and the second phase component to embed the second set of data into at least one of the first channel and the second channel. The at least one of the first phase component and the second phase component may be modified if a portion of one of the first phase component and the second phase component is not different than a portion of the other one of the first phase component and the second phase component by more than a threshold based on psychoacoustic properties of human hearing.

If the at least one of the first phase component and the second phase component is modified, a first logical value (e.g., logical 0 or word 00) of the second set of data may be embedded into the audio signal by setting the portion of one of the first phase component and the second phase component equal to the portion of the other one of the first phase component and the second phase component. If the at least one of the first phase component and the second phase component is modified, a second logical value (e.g., logical 1, word 01, word 10, or word 11) of the second set of data may be embedded into the audio signal by setting the portion of one of the first phase component and the second phase component equal to or less than a threshold related to an interaural phase difference (IPD).

The first set of data and the second set of data may include at least one of audio data, text data, video data, image data, and multimedia data. The second set of data may also include encrypted data, as well as at least one of authentication data, content enhancement data, and distribution control data.

Embodiment for Determining Data Embedded into an Audio Signal

Figure 9:
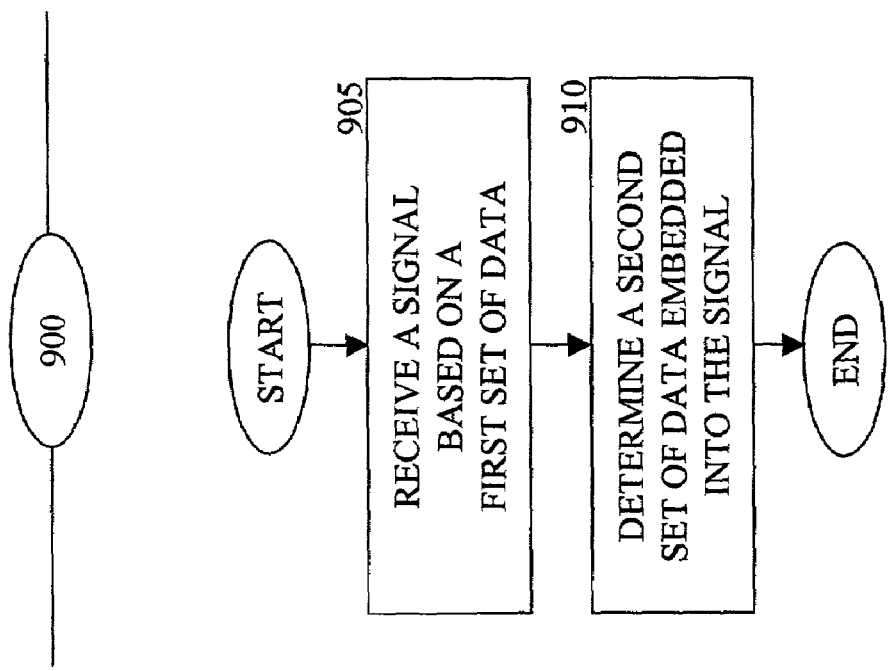
FIG. 9 depicts an embodiment of a method for determining data embedded into an audio signal.

FIG. 9 illustrates an embodiment of a general method 900 for determining data embedded into an audio signal. In block 905, the method 900 receives an audio signal. The audio signal is based on a first set of data and includes a phase component. In block 910, the method 900 then determines a second set of data embedded into the audio signal based on the phase component of the audio signal. The audio signal can be made to differ with respect to the original audio signal in a manner that is at least one of (i) substantially imperceptible and (ii) imperceptible to a listener of the first set of data.

The audio signal may include a first channel and a second channel. The first channel includes a first phase component and the second channel includes a second phase component. The first phase component and the second phase component may be determined using Fourier analysis. A data bit of the second set of data embedded into the audio signal may be determined to be a first logical value (e.g., logical 0 or word 00) if a portion of one of the first phase component and the second phase component differs from a portion of the other one of the first phase component and the second phase component by less than or equal to a first threshold related to an interaural phase difference (IPD). On the other hand, a data bit of the second set of data embedded into the audio signal may be determined to be a second logical value (e.g., logical 1, word 00, word 01 or word 11) if a portion of one of the first phase component and the second phase component differs from a portion of the other of the first phase component and the second phase component by less than or equal to a second threshold related to an interaural phase difference (IPD) but more than the first threshold related to an interaural phase difference (IPD).

The first set of data and the second set of data may include at least one of audio data, text data, video data, image data, and multimedia data. The second set of data may also include encrypted data, as well as at least one of authentication data, content enhancement data, and distribution control data.

Figure 10:
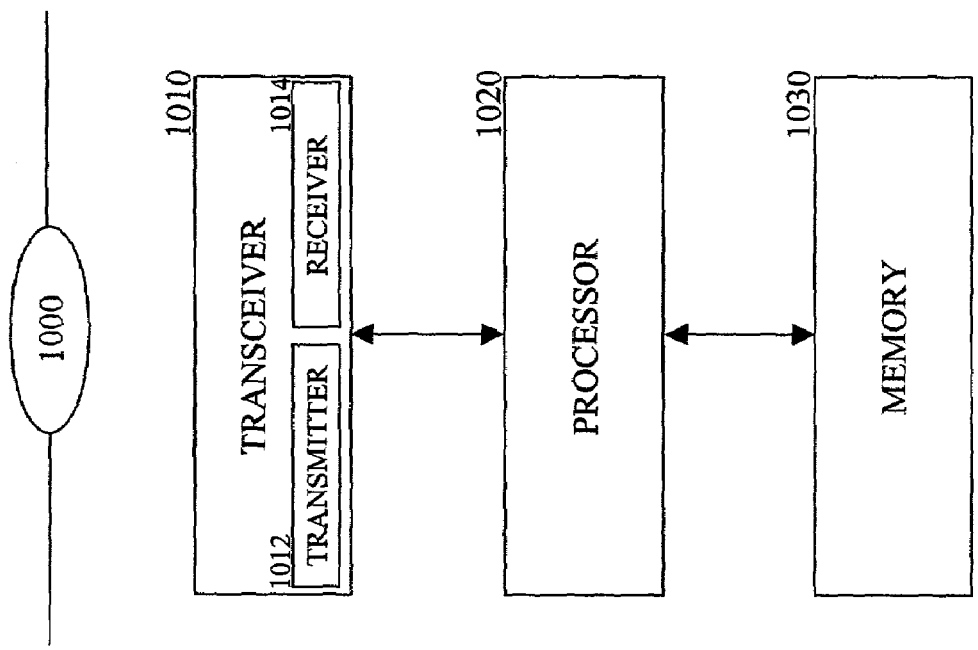
FIG. 10 depicts an embodiment of an apparatus for embedding data into an audio signal and/or determining data embedded into an audio signal.
Figure 11:
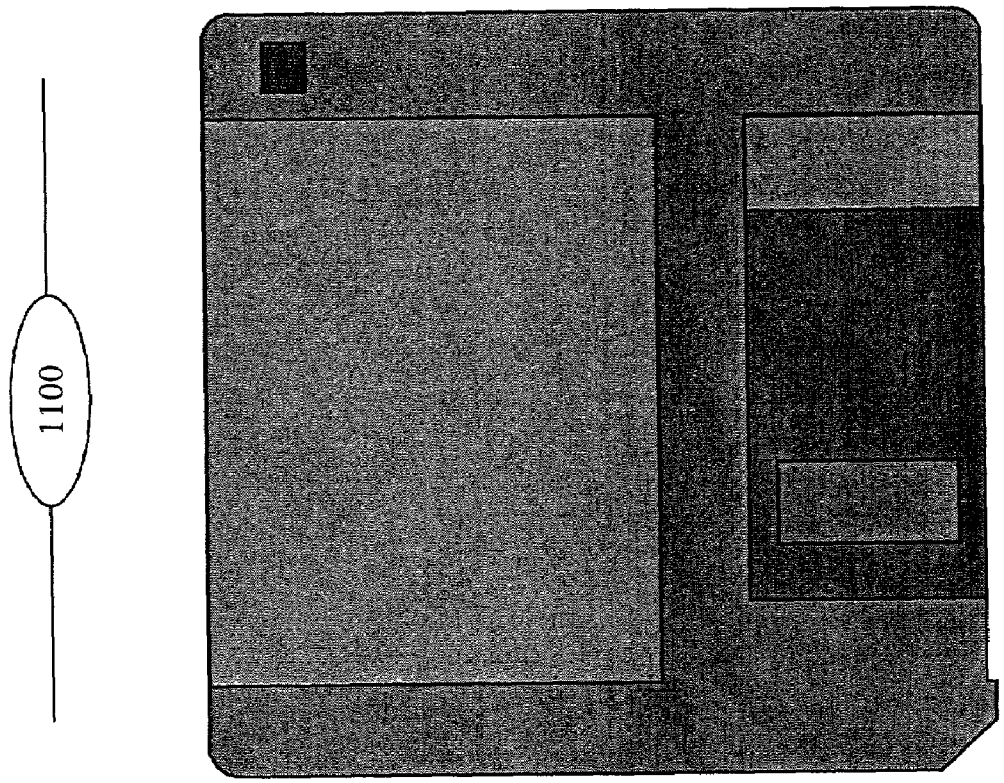
FIG. 11 depicts an embodiment of a machine-readable medium having encoded information, which when read and executed by a machine causes a method for embedding data into an audio signal and/or determining data embedded into an audio signal.

Embodiment of an Apparatus for Embedding Data into an Audio Signal and/or Determining Data Embedded into an Audio Signal FIG. 10 illustrates an embodiment an apparatus 1000 for embedding data into an audio signal and/or determining data embedded into an audio signal. The apparatus 1000 may comprise a transceiver 1010, a processor 1020, and memory 1030. The transceiver 1010 includes a transmitter 1012 that allows the apparatus 1000 to transmit information, for example, to a network (not shown) over a communications link (not shown). The transceiver 1010 also includes a receiver 1014 that allows the apparatus 1000 to receive information, for example, from the network over the communications link. Such transmission and reception operations over the communications link may be conducted using the same or different data rates, communications protocols, carrier frequencies, and/or modulation schemes. Likewise, the operations and/or circuit configurations of the transmitter 1012 and the receiver 1014, respectively, may be completely independent of one another or, alternatively, may be partially or fully integrated.

The processor 1020, which may comprise one or more microprocessors, microcontrollers, or other arrays of logic elements, controls the operation of the apparatus 1000 according to a sequence of commands that may be (i) stored in the memory 1030 or in another storage means within or coupled to the apparatus 1000, (ii) entered by a user through an interface such as a data entry device (i.e., a keypad) (not shown), and/or (iii) received from the network over the communications link. As will apparent to those skilled in the art, the processor itself may in an embodiment comprise the memory 1030 and transceiver 1010.

In view of the foregoing, it will be apparent to one of ordinary skill in the art that the described embodiments may be implemented in software, firmware, and hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and control hardware to implement the embodiments of the present invention based on the description herein.

In short, in binaural hearing the MAA is the minimum detectable angular displacement of a sound source and defines the ability to determine a moving sound source. Embodiments of the present invention extended MAA results for simple acoustic stimuli to more complex sounds. Angular displacement of a sound source translates to a frequency-dependent IPD. The IPD tolerance was tested in a series of psychoacoustic experiments where the short-time phase spectrum of various audio signals were randomly varied within a range controlled by the MAA. Listening tests confirmed the validity of the MAA results for more complex sounds.

An embodiment of a method encodes new digital information in various forms (e.g., text, images, speech and music) into the phase spectrum of audio signals in a manner that complies with an IPD tolerance (e.g., the inaudible range of the IPD). In an embodiment, the rate of information masked in the auxiliary channel can vary, for example, from 26 kbits/sec to 71 kbits/sec, and may be further increased by using more sophisticated quantization schemes. The described method is: computationally efficient; allows for the simultaneous encoding of a masked multimedia channel; may be used in applications where the inclusion of parallel or secure information in an audio signal is needed; and may mask more information than methods using audio power spectrum masking. The information encoded in the audio signal may also be recovered.

The described method for audio signal coding moreover allows for the addition of information to an original audio signal in a manner that is not perceptible by listening. Applications of this method may include, for example, the efficient and secure transmission and storage of audio information over non-homogeneous and non-secure networks, such as the Internet. Watermarking, and the secure broadcasting and marketing of music are a few of the many possible applications of this method.

Other Embodiments of the Present Invention

Authentication and Control of Content Distribution

The proliferation of the Internet as a non-secure digital distribution mechanism for multimedia facilitating the transfer of digital audio, images and/or video, and the creation of perfect copies has accentuated the need for technical measures for copyright protection. For example, authentication information in the form of a watermark may be included as masked auxiliary information to combat unauthorized and illegal use of data. The Digital Transmission Content Protection ("DTCP") specification, for example, defines a cryptographic protocol for the copy control of audio and video information transmitted through a network. This information may be included in the masked auxiliary channel, as described herein, without perceptible loss of quality. Other exemplary masked auxiliary information applications include:

Creation of user or machine specific copies and their subsequent destruction if copying conditions are violated The identification and tracing of illegal copies (in music and video media such as DVD, CD, Mini-Disc, and in TV and radio broadcasting)

Time stamping of legally authorized copies

Automatic scrambling or self-destruction of multimedia data after a lapse of time of their legally authorized use Content Enhancement Audio information may be enhanced if accompanied by text and images. As such, the masked auxiliary channel may provide digital information appropriately time-matched with the main audio, and may include:

Lyrics of songs

Musical scores

Scripts of operas and musicals, and subtitles for foreign language movies

Closed captioning

Images for dramatization

Telephone-quality narrative speech

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit, or some other programmable machine or system. As such, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A method for embedding data into an audio signal, the audio signal being based on a first set of data and including a phase component, the method comprising:
modifying at least a portion of the phase component of the audio signal to embed a second set of data into the audio signal,
wherein the modified audio signal can be made to differ with respect to the audio signal in a manner at least one of (i) substantially imperceptible and (ii) imperceptible to a listener of the first set of data depending on the extent that the phase component of the audio signal is modified, wherein the phase component of the audio signal is modified based on a threshold related to a minimum audible angle (MAA), wherein the threshold related to the minimum audible angle includes from 1 to 3 degrees.

2. A method for embedding data into an audio signal, the audio signal being based on a first set of data and including a phase component, the method comprising:
modifying at least a portion of the phase component of the audio signal to embed a second set of data into the audio signal,
wherein the modified audio signal can be made to differ with respect to the audio signal in a manner at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the at least one of the first phase component and the second phase component is modified if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a first logical value of the second set of data is embedded into the audio signal by setting the portion of one of the first phase component and the second phase component equal to the portion of the other one of the first phase component and the second phase component.

3. A method for embedding data into an audio signal, the audio signal being based on a first set of data and including a phase component, the method comprising:
modifying at least a portion of the phase component of the audio signal to embed a second set of data into the audio signal,
wherein the modified audio signal can be made to differ with respect to the audio signal in a manner at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the at least one of the first phase component and the second phase component is modified if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a second logical value of the second set of data is embedded into the audio signal by setting the portion of one of the first phase component and the second phase component equal to or less than a threshold related to an interaural phase difference (IPD).

4. A method for determining data embedded into an audio signal, the audio signal being based on a first set of data of an original audio signal and including a phase component, the method comprising:
determining a second set of data embedded into the audio signal based on the phase component of the audio signal,
wherein the audio signal differs with respect to the original audio signal in a manner that is at least one of (i) substantially imperceptible and (ii) imperceptible to a listener of the first set of data, wherein the audio signal includes a first channel and a second channel, the first channel including a first phase component and the second channel including a second phase component, wherein a data bit of the second set of data embedded into the audio signal is determined to be a first logical value if a portion of one of the first phase component and the second phase component differs from a portion of the other one of the first phase component and the second phase component by less than or equal to a first threshold related to an interaural phase difference (IPD).

5. The method of claim 4, wherein a data bit of the second set of data embedded into the audio signal is determined to be a second logical value if a portion of one of the first phase component and the second phase component differs from a portion of the other of the first phase component and the second phase component by less than or equal to a second threshold related to an inter aural phase difference (IPD) but more than the first threshold related to an interaural phase difference (IPD).

6. An apparatus for embedding data into an audio signal, the audio signal being based on a first set of data and including a phase component, the apparatus comprising:
a processor configured to modify at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the processor is configured to modify the phase component of the audio signal based on a threshold related to a minimum audible angle (MAA), wherein the threshold related to the minimum audible angle includes from 1 to 3 degrees.

7. An apparatus for embedding data into an audio signal, the audio signal being based on a first set of data and including a phase component, the apparatus comprising:

a processor configured to modify at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the processor is configured to modify the at least one of the first phase component and the second phase component if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a first logical value of the second set of data is embedded into the audio signal by setting the portion of one of the first phase component and the second phase component equal to the portion of the other one of the first phase component and the second phase component.

8. An apparatus for embedding data into an audio signal, the audio signal being based on a first set of data and including a phase component, the apparatus comprising:

a processor configured to modify at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the processor is configured to modify the at least one of the first phase component and the second phase component if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a second logical value of the second set of data is embedded into the audio signal by setting the portion of one of the first phase component and the second phase component equal to or less than a threshold related to an interaural phase difference (IPD).

9. An apparatus for determining data embedded into an audio signal, the audio signal being based on a first set of data of an original audio signal and including a phase component, the apparatus comprising: a processor configured to determine a second set of data embedded into the audio signal based on the phase component of the audio signal, wherein the audio signal differs with respect to the original audio signal in a manner that is at least one of (i) substantially imperceptible and (ii) imperceptible to a listener of the first set of data, wherein the audio signal includes a first channel and a second channel, the first channel including a first phase component and the second channel including a second phase component, wherein the processor is configured to determine a data bit of the second set of data embedded into the audio signal to be a first logical value if a portion of one of the first phase component and the second phase component differs from a portion of the other one of the first phase component and the second phase component by less than or equal to a first threshold related to an interaural phase difference (IPD).

10. The apparatus of claim 9, wherein the processor is configured to determine a data bit of the second set of data embedded into the audio signal to be a second logical value if a portion of one of the first phase component and the second phase component differs from a portion of the other of the first phase component and the second phase component by less than or equal to a second threshold related to an interaural phase difference (IPD) but more than the first threshold related to an interaural phase difference (IPD).

11. A machine-readable medium having encoded information, which when read and executed by a machine causes a method for embedding data into an audio signal, the audio signal being based on a first set of data and including a phase component, the method comprising:

modifying at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the phase component of the audio signal is modified based on a threshold related to a minimum audible angle (MAA), wherein the threshold related to the minimum audible angle includes from 1 to 3 degrees.

12. A machine-readable medium having encoded information, which when read and executed by a machine causes a method for embedding data into an audio signal, the audio signal being based on a first set of data and including a phase component, the method comprising:

modifying at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the at least one of the first phase component and the second phase component is modified if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a first logical value of the second set of data is embedded into the audio signal by setting the portion of one of the first phase component and the second phase component equal to the portion of the other one of the first phase component and the second phase component.

13. A machine-readable medium having encoded information, which when read and executed by a machine causes a method for embedding data into an audio signal, the audio signal being based on a first set of data and including a phase component, the method comprising:

modifying at least a portion of the phase component of the audio signal to embed a second set of data into the audio signal, wherein the second set of data embedded into the audio signal can be made at least one of (i) substantially imperceptible and (ii) imperceptible to a listener of the first set of data depending on the extent that the phase component of the audio signal is modified, wherein the audio signal includes a first channel and a second channel, the first channel including a first phase component and the second channel including a second phase component, wherein modifying at least a portion of the phase component of the audio signal to embed the second set of data into the audio signal includes modifying at least a portion of at least one of the first phase component and the second phase component to embed the second set of data into at least one of the first channel and the second channel, wherein the at least one of the first phase component and the second phase component is modified if a portion of one of the first phase component and the second phase component is not different than a portion of the other one of the first phase component and the second phase component by more than a threshold based on psychoacoustic properties of human hearing, wherein if the at least one of the first phase component and the second phase component is modified, a second logical value of the second set of data is embedded into the audio signal by setting the portion of one of the first phase component and the second phase component equal to or less than a threshold related to an interaural phase difference (IPD).

14. A machine-readable medium having encoded information, which when read and excuted by a machine causes a method for determining data embedded into an audio signal, the audio signal being based on a first set of data of an original audio signal and including a phase component, the method comprising:

determining a second set of data embedded into the audio signal based on the phase component of the audio signal, wherein the audio signal differs with respect to the original audio signal in a manner that is at least one (i) substantially imperceptible and (ii) imperceptible to a listener of the first set of data wherein the audio signal includes a first channel and a second channel, the first channel including a first phase component and the second channel including a second phase component, wherein a data bit of the second set of data embedded into the audio signal is determined to be a first logical value if a portion of one of the first phase component and the second phase component differs from a portion of the other one of the first phase component and the second phase component by less than or equal to a first threshold related to an interaural phase difference (IPD).

15. The machine-readable medium of claim 14, wherein a data bit of the second set of data embedded into the audio signal is determined to be a second logical value if a portion of one of the first phase component and the second phase component differs from a portion of the other of the first phase component and the second phase component by less than or equal to a second threshold related to an interaural phase difference (IPD) but more than the first threshold related to an interaural phase difference (IPD).

* * * * *